US012805556B2

(12) United States Patent
Duan et al.

(10) Patent No.: US 12,805,556 B2
(45) Date of Patent: Nov. 24, 2026

(54) LOW GLYCEMIC INDEX (GI) TOTAL NUTRITION FORMULA MILK AND PREPARATION METHOD THEREFOR

(71) Applicant: China Food Fermentation Industry Research Institute Co. , Ltd., Beijing (CN)

(72) Inventors: Shenglin Duan, Beijing (CN); Kai Xia, Beijing (CN); Jinyang Liu, Beijing (CN); Peng Yuan, Beijing (CN); Jia Liu, Beijing (CN); Zhenxin Du, Beijing (CN); Xin Yu, Beijing (CN); Shiwei Liu, Beijing (CN); Lu Zhang, Beijing (CN); Xiaofeng Han, Beijing (CN); Zongling Yang, Beijing (CN); Zhenjiang Ding, Beijing (CN); Yingxiang Wang, Beijing (CN); Xishan Ma, Beijing (CN); Xi Wang, Beijing (CN)

(73) Assignee: China Food Fermentation Industry Research Institute Co., Ltd., Beijing (CN)

( * ) Notice: Subject to any disclaimer, the term of this patent is extended or adjusted under 35 U.S.C. 154(b) by 279 days.

(21) Appl. No.: 18/640,039

(22) Filed: Apr. 19, 2024

(65) Prior Publication Data

US 2025/0228281 A1 Jul. 17, 2025

(30) Foreign Application Priority Data

Jan. 15, 2024 (CN) ......................... 202410057459.9

(51) Int. Cl.

| | |
|---|---|
| *A23L 33/00* | (2016.01) |
| *A23L 33/12* | (2016.01) |
| *A23L 33/125* | (2016.01) |
| *A23L 33/15* | (2016.01) |
| *A23L 33/16* | (2016.01) |
| *A23L 33/24* | (2016.01) |

(52) U.S. Cl.

CPC ............... *A23L 33/40* (2016.08); *A23L 33/12* (2016.08); *A23L 33/125* (2016.08); *A23L 33/15* (2016.08); *A23L 33/16* (2016.08); *A23L 33/24* (2016.08)

(58) Field of Classification Search

CPC .......... A23L 33/40; A23L 33/24; A23L 33/12; A23L 33/16; A23L 33/125; A23L 33/15

See application file for complete search history.

(56) References Cited

U.S. PATENT DOCUMENTS

2016/0278419 A1* 9/2016 Vurma .................. A23L 33/115

FOREIGN PATENT DOCUMENTS

| | | | | | |
|---|---|---|---|---|---|
| CN | 112754017 | A | | 5/2021 | |
| CN | 114365841 | A | * | 4/2022 | A23L 33/40 |
| CN | 116369513 | A | * | 7/2023 | A23L 33/10 |
| CN | 116616437 | A | | 8/2023 | |

* cited by examiner

*Primary Examiner* — Stephanie A Kohler

(74) *Attorney, Agent, or Firm* — Rondaus PLLC; George Liu

(57) ABSTRACT

The present invention provides low glycemic index (GI) total nutrition formula emulsion and a preparation method therefor. The low GI total nutrition formula emulsion comprises the following raw material components in parts by weight: 10-14 parts of carbohydrates, 4-5 parts of calcium caseinate, 1.3-2 parts of dietary fiber, 0.1-0.15 part of sodium chloride, 0.1-0.12 part of sodium citrate, 0.1-0.15 part of potassium citrate, 0.15-0.2 part of magnesium chloride, 0.1-0.15 part of dipotassium hydrogen phosphate, 0.05-0.1 part of compound vitamins, 0.05-0.1 part of compound minerals, 2.5-3.6 parts of compound oil, 0.3-0.5 part of phospholipid, 0.2-0.5 part of medium chain triglyceride (MCT), 0.04-0.08 part of colloids. The preparation method comprises: preparing aqueous phases and oil phases from the raw materials step by step; mixing the aqueous phases and oil phases; and shearing, homogenizing and sterilizing the mixture to obtain the low GI total nutrition emulsion. The product features balanced and complete nutrition.

5 Claims, 4 Drawing Sheets

LOW GLYCEMIC INDEX (GI) TOTAL NUTRITION FORMULA MILK AND PREPARATION METHOD THEREFOR

TECHNICAL FIELD

The present invention belongs to the technical field of food production, and particularly relates to low glycemic index (GI) total nutrition formula emulsion and a preparation method therefor.

BACKGROUND

Total nutrition emulsion is a special medical formula food which can serve as a single nutrition source to meet a nutritional requirement of a target population and features a wide application prospect. The total nutrition emulsion, as a nutrition support food, can play roles of reducing a nutritional risk and achieving a nutritional "treatment", has effects of regulating the immunity, alleviating the oxidative stress, maintaining the gastroenteric function and structure, promoting wound healing, improving the survival rate of the patients, shortening the duration of hospital stays and the like, and is more cost-efficient compared with parenteral nutrition.

Carbohydrates in the total nutrition emulsion are an energy source which exerts a major influence on glycemic index (GI). Different carbohydrates contain different proportions and types of saccharides, starch and dietary fiber, which will directly affect the stability of blood glucose. Some carbohydrates which can raise and reduce blood glucose are known as low GI foods. On the contrary, some other carbohydrates which can induce rapid fluctuation of blood glucose level are known as high GI foods. A GI value may be used to predict an approximate peak value of postprandial blood sugar, the maximum glucose fluctuation and other attributes of a reaction curve. A large number of studies have shown that a low GI diet is more slowly digested and absorbed in a human body, such that it is beneficial to controlling the postprandial blood sugar, improving diabetes, appropriately controlling the body weight and reducing the cardiovascular incidence rate.

Maltodextrin, an incomplete hydrolysate of starch, has a relatively low DE value (glucose equivalent), and is unlikely to brown, contributing to absorption of vitamins and minerals. Maltodextrin features better emulsifying and thickening effects, and may increase the viscosity, enhance the dispersibility and solubility of the product, improve the taste, and prolong the shelf life of the product. Maltodextrin is good in solubility, is unlikely to agglomerate, is extremely digested and absorbed by the human body, and may promote the metabolism and enhance the immunity. Maltodextrin is the most commonly used carbohydrate source in enteral total nutrition preparations. However, thanks to its high GI, it is harmful to controlling the blood glucose.

A Chinese patent for invention CN114365841A discloses total nutrition emulsion suitable for renal patients and a preparation method therefor. Total nutrition emulsion per 100 ml contains 20-30 g of carbohydrates, 4-8 g of fat, 1.2-2.0 g of dietary fiber, 0.1-1.0 g of vitamins, 0.5-2.5 g of minerals, 3.0-5.0 g of casein, 0.2-0.4 g of phospholipid, 0.03-0.05 g of sucrose fatty acid ester, and 0.01-0.05 g of carrageenan. For the total nutrition emulsion, by improving the combination, proportion and preparation method of different carbohydrates, the stability of the product is improved, where influence of proportioning of different components and different carbohydrates on GI is not involved.

A Chinese patent for invention CN116369513A discloses a total nutrition emulsion solution for a special medical purpose without adding an extra stabilizer. The total nutrition emulsion is prepared from the following raw materials in percent by weight: 5-7% of sodium caseinate, 10-20% of maltodextrin, 3-5% of soybean oil, 0.01-0.05% of a vitamin premix, 0.7-1.1% of a mineral premix, and the balance of water. Any stabilizer is not used in the total nutrition emulsion. Dispersed particles of a system are refined only by adjusting the strength of physical processing methods such as shearing and homogenizing, such that the heat resistance of a protein-polysaccharide complex is improved. The product prepared by the method features high stability, small droplets of emulsion fat, convenience in operation and environment friendliness and health. However, the product only contains one high GI carbohydrate (maltodextrin), such that it cannot be selected as the low GI diet for reference.

Therefore, to research and develop total nutrition low GI formula emulsion is of great significance, where high protein digestive performance and good flavor and taste of the total nutrition low GI formula emulsion are kept while its low GI is kept, and the total nutrition low GI formula emulsion has the performance of high stability.

SUMMARY

Aiming at problems in the prior art, the present invention provides low GI total nutrition formula emulsion and a preparation method therefor. The total nutrition formula emulsion prepared by a formula and the preparation method provided by the present invention features balanced and complete nutrition, fine and silky taste, harmonious taste, uniform structural state, uniform color and luster and good mobility, high stability, and is a low GI food, which contributes to blood glucose control.

In order to achieve the above object, the present invention uses the following technical solution:

on the one hand, the present invention provides low GI total nutrition formula emulsion, including the following raw material components in parts by weight: 10-14 parts of carbohydrates, 4-5 parts of calcium caseinate, 1.3-2 parts of dietary fiber, 0.1-0.15 part of sodium chloride, 0.1-0.12 part of sodium citrate, 0.1-0.15 part of potassium citrate, 0.15-0.2 part of magnesium chloride, 0.1-0.15 part of dipotassium hydrogen phosphate, 0.05-0.1 part of compound vitamins, 0.05-0.1 part of compound minerals, 2.5-3.6 parts of compound oil, 0.3-0.5 part of phospholipid, 0.2-0.5 part of medium chain triglyceride (MCT), and 0.04-0.06 part of colloids.

Preferably, the low GI total nutrition formula emulsion includes the following raw material components in parts by weight: 11-13 parts of carbohydrates, 4.3-4.8 parts of calcium caseinate, 1.5-1.8 parts of dietary fiber, 0.12-0.13 part of sodium chloride, 0.1-0.11 part of sodium citrate, 0.12-0.13 part of potassium citrate, 0.16-0.18 part of magnesium chloride, 0.12-0.13 part of dipotassium hydrogen phosphate, 0.06-0.08 part of compound vitamins, 0.06-0.08 part of compound minerals, 3.0-3.6 parts of compound oil, 0.35-0.45 part of phospholipid, 0.3-0.4 part of MCT, and 0.05-0.07 part of colloids.

Further preferably, the low GI total nutrition formula emulsion includes the following raw material components in parts by weight: 12 parts of carbohydrates, 4.5 parts of calcium caseinate, 1.6 parts of dietary fiber, 0.12 part of sodium chloride, 0.1 part of sodium citrate, 0.12 part of potassium citrate, 0.17 part of magnesium chloride, 0.12 part of dipotassium hydrogen phosphate, 0.08 part of compound vitamins, 0.07 part of compound minerals, 3.3 parts of compound oil, 0.4 part of phospholipid, 0.35 part of MCT, and 0.05 part of colloids.

Preferably, the carbohydrates are cassava dextrin or a mixture of cassava dextrin and maltodextrin. When the carbohydrates are the mixture of cassava dextrin and maltodextrin, a mass ratio of cassava dextrin to maltodextrin is (12-6):(0-6).

Further preferably, the mass ratio of cassava dextrin to maltodextrin is (10-8):(2-4).

Preferably, the dietary fiber is selected from at least two of inulin, resistant dextrin, and soybean dietary fiber.

Preferably, the colloids are selected from at least one of gellan gum, carrageenan, and microcrystalline cellulose.

Preferably, a mass ratio of the dietary fiber, the compound minerals and the compound oil is (1.3-2):(0.05-0.1):(2.5-3.6).

Preferably, the mass ratio of the dietary fiber, the compound minerals and the compound oil is (1.5-1.8):(0.06-0.08):(3.0-3.6).

Further preferably, the mass ratio of the dietary fiber, the compound minerals and the compound oil is 1.6:0.07:3.3.

On the other hand, the present invention provides a method for preparing the low glycemic index (GI) total nutrition formula emulsion, including the following steps:

S1: preparing a carbohydrate solution: mixing carbohydrate and water to obtain a mixture, and stirring the mixture;

S2: mixing calcium caseinate, dietary fiber and colloids to obtain a mixture and then continuously mixing the mixture and the carbohydrate solution in S1 to obtain a mixed solution;

S3: mixing sodium chloride, sodium citrate, potassium citrate, magnesium chloride, dipotassium hydrogen phosphate, compound vitamins and compound minerals and the mixed solution in S2 in a sequential order to obtain a mixture, and stirring the mixture for 0.5-1 h to form an aqueous phase;

S4: regulating the pH value of the aqueous phase with an alkaline solution to alkalescence, and heating the mixture to form a heated aqueous phase solution;

S5: weighing compound oil, phospholipid and MCT, and mixing, stirring and heating the mixture to form an oil phase;

S6: shearing the aqueous phase solution heated in S4 and the oil phase in S5 to form a coarse emulsion, and homogenizing, filling and sterilizing the coarse emulsion, and cooling the coarse emulsion to obtain the low GI total nutrition emulsion.

Preferably, in step S1, water is added at a solid-liquid ratio of 1:(3-6) (g/mL) for mixing, the stirring time is 5-30 min until the carbohydrates are dissolved.

Further preferably, the stirring time in step S1 is 10-20 min.

Preferably, in step S2, a specific mode for continuous mixing is stirring and mixing, where the stirring time is 0.2-2 h and the stirring rotating speed is 10-30 Hz.

Further preferably, in step S2, the specific mode for continuous mixing is stirring and mixing, where the stirring time is 0.5-1 h and the stirring rotating speed is 20 Hz.

Preferably, in step S3, the stirring time is 0.2-2 h and the stirring rotating speed is 10-30 Hz.

Further preferably, in step S3, the stirring time is 0.5-1 h and the stirring rotating speed is 20 Hz.

Preferably, in step S4, the alkaline solution is an alkaline solution with the concentration of 0.5-2% and is selected from at least one of NaOH, KOH, and sodium carbonate.

Further preferably, the alkaline solution is a KOH solution with the mass concentration of 1%.

Preferably, in step S4, the pH value of the alkalescence is 7.1-8.0; further preferably, the pH value of the alkalescence is 7.2-7.5; and further preferably, the pH value of the alkalescence is 7.3.

Preferably, the heating in step S4 is heating to 50-70° C.; further preferably, the heating is heating to 55-65° C.; and further preferably, the heating is heating to 60° C.

Preferably, continuous stirring is needed in the heating in step S4.

Preferably, the heating temperature of the stirring heating in step S5 is 60-80° C., the stirring rotating speed is 10-30 Hz, and the time is 10-30 min, to form the oil phase.

Further preferably, the heating temperature of the stirring heating in step S5 is 70° C., the stirring rotating speed is 10 Hz, and the time is 20 min, to form the oil phase.

Preferably, in step S6, the using concentration of the oil phase is 3-10%; and further preferably, the using concentration of the oil phase is 5%.

Preferably, in step S6, a specific mode for shearing is shearing at 6000-8000 rpm for 3-5 min; and a specific mode for homogenizing is homogenizing at a pressure of 40-50 MPa 1-2 times.

Further preferably, in step S6, the specific mode for shearing is shearing at 7000 rpm for 4 min; and a specific mode for homogenizing is homogenizing at a pressure of 45 MPa 1 time.

Preferably, in step S6, the sterilizing temperature is 110-130° C. and the sterilizing time is 10-20 min; and further preferably, the sterilizing temperature is 121° C. and the sterilizing time is 15 min.

Compared with the prior art, the present invention has the following beneficial effects:

1. According to the total nutrition emulsion provided by the present invention, the components match reasonably; the eating mode is simple and the total nutrition emulsion needs not to be brewed, so that secondary pollution can be avoided when the total nutrition emulsion is brewed; and the total nutrition formula emulsion prepared by a formula and the preparation method provided by the present invention features balanced and complete nutrition, fine and silky taste, harmonious taste, uniform structural state, uniform color and luster and good mobility, high stability, and high in shelf life, and is a low GI food.

2. According to the total nutrition emulsion, by adjusting the proportion of the components, proteins are more beneficially digested and absorbed. The total nutrition emulsion plays excellent roles of regulating the immunity, alleviating the oxidative stress, maintaining the gastroenteric function and structure, promoting wound healing, improving the survival rate of the patients, shortening the duration of hospital stays and the like.

DETAILED DESCRIPTION OF THE EMBODIMENTS

Figure 1:
FIG. 1 is total nutrition formula emulsion prepared in an embodiment 2 of the present invention.

The non-restrictive embodiments below contributes to understanding the present invention more comprehensively by a person of ordinary skill in the art but do not limit the present invention in any form. The contents below are merely exemplary description of the scope claimed by the present invention. A person skilled in the art can make various alternations and modifications on the present invention according to the disclosed content and the alternations and modifications shall also fall within the scope claimed by the present invention.

When numerical value ranges are given in the embodiments, it shall be understood that unless otherwise specified in the present invention, two endpoints and any numerical value between the two end points of each numerical value range can be used. Unless otherwise defined, all technical and scientific terms used in the present invention have the same meanings as commonly understood by a person of ordinary skill in the art to which the present invention belongs.

The present invention will be further described below by way of specific embodiments. Unless otherwise specified, various chemical reagents used in the embodiments of the present invention are obtained from a conventional commercial approach.

In the embodiments below, the maltodextrin is purchased from Baolingbao Biology Co., Ltd., with the article number of Glucidex6; the cassava dextrin is purchased from ROQUETTE (China) Co., Ltd., with the article number of TA90; the calcium caseinate is purchased from Fonterra Co-operative Group, with the article number of 390; the inulin is purchased from COSUCRA, with the article number of Fibruline; the resistant dextrin is purchased from ROQUETTE (China) Co., Ltd., with the article number of E590; the soybean dietary fiber is purchased from Gaotang Lufaxinde Biotechnology Co., Ltd., with the article number of submicron powder; the compound vitamins are purchased from Licheng Biotechnology Co., Ltd., with the article number of RIVIMIX A-230303-Vit; the vitamin composition includes pantothenic acid, biotin, vitamin A, vitamin B1, vitamin B12, vitamin B2, vitamin B6, vitamin C, vitamin D3, vitamin E, vitamin K1, niacin, and folic acid; the compound minerals are purchased from Licheng Biotechnology Co., Ltd., with the article number of RIVIMIX A-230303-Vit, where the mineral element composition includes: iodine, manganese, iron, copper, selenium, and zinc; the compound oil is purchased from AAK group, with the article number of AKOVITA7073, where a composition formula includes high oleic sunflower seed oil and soybean oil; the phospholipid is purchased from Cargill, with the article number of TOPCITHINSB; the MCT (medium chain triglyceride) is purchased from AAK group, with the article number of E6000HY01-1; and the colloids: gellan gum, carrageenan, and microcrystalline cellulose are purchased from CPKelco, with the article numbers of HMBP-C, J-DS, and 791F. The soybean protein isolate is purchased from Du Pont Company, with the article number of 760CIP.

For the above components, the products of different manufacturers do not affect the effect significantly.

Example 1

Low GI total nutrition formula emulsion includes the following raw material components in parts by weight: 9 parts of cassava dextrin, 3 parts of maltodextrin, 4.5 parts of calcium caseinate, 0.7 part of inulin, 0.9 part of soybean dietary fiber, 0.12 part of sodium chloride, 0.1 part of sodium citrate, 0.12 part of potassium citrate, 0.17 part of magnesium chloride, 0.12 part of dipotassium hydrogen phosphate, 0.08 part of compound vitamins, 0.07 part of compound minerals, 3.3 parts of compound oil, 0.4 part of phospholipid, 0.35 part of MCT, 0.015 part of gellan gum, 0.01 part of carrageenan, and 0.025 part of microcrystalline cellulose.

Figure 2:
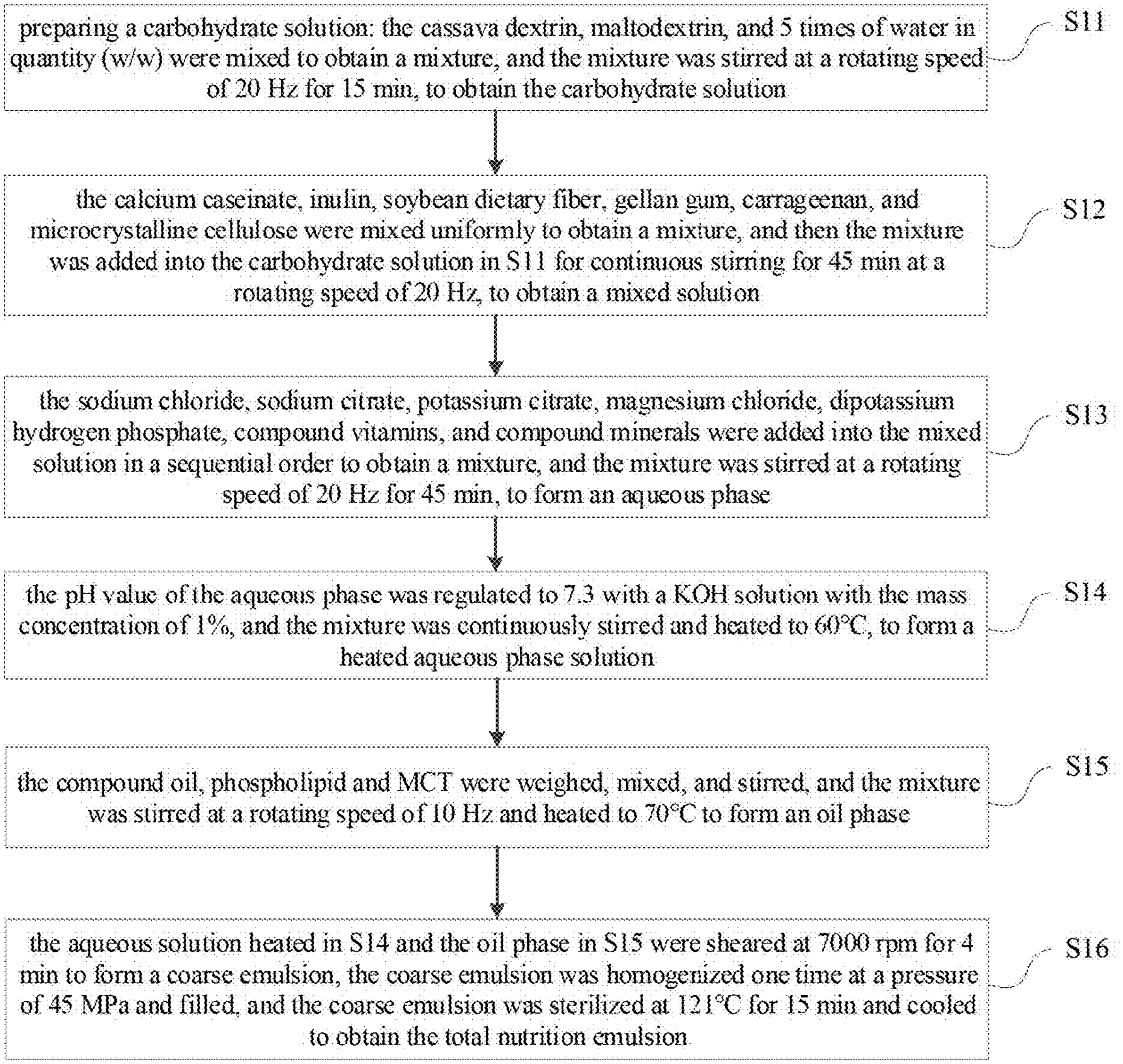
FIG. 2 is a method for preparing the low GI total nutrition formula emulsion in the example 1.

As show in FIG. 2, a method for preparing the low GI total nutrition formula emulsion in the example includes the following steps:

S11: preparing a carbohydrate solution: the cassava dextrin, maltodextrin, and 5 times of water in quantity (w/w) were mixed to obtain a mixture, and the mixture was stirred at a rotating speed of 20 Hz for 15 min, to obtain the carbohydrate solution;

S12: the calcium caseinate, inulin, soybean dietary fiber, gellan gum, carrageenan, and microcrystalline cellulose were mixed uniformly to obtain a mixture, and then the mixture was added into the carbohydrate solution in S11 for continuous stirring for 45 min at a rotating speed of 20 Hz, to obtain a mixed solution;

S13: the sodium chloride, sodium citrate, potassium citrate, magnesium chloride, dipotassium hydrogen phosphate, compound vitamins, and compound minerals were added into the mixed solution in a sequential order to obtain a mixture, and the mixture was stirred at a rotating speed of 20 Hz for 45 min, to form an aqueous phase;

S14: the pH value of the aqueous phase was regulated to 7.3 with a KOH solution with the mass concentration of 1%, and the mixture was continuously stirred and heated to 60° C., to form a heated aqueous phase solution;

S15: the compound oil, phospholipid and MCT were weighed, mixed, and stirred, and the mixture was stirred at a rotating speed of 10 Hz and heated to 70° C. to form an oil phase;

S16: the aqueous solution heated in S14 and the oil phase in S15 were sheared at 7000 rpm for 4 min to form a coarse emulsion, the coarse emulsion was homogenized one time at a pressure of 45 MPa and filled, and the coarse emulsion was sterilized at 121° C. for 15 min and cooled to obtain the total nutrition emulsion.

Example 2

Different from the example 1, the raw material components of the total nutrition emulsion are different. Specifically, the maltodextrin is replaced by cassava dextrin, that is, the carbohydrates are 12 parts of cassava dextrin.

Total nutrition formula emulsion includes the following raw material components in parts by weight: 12 parts of cassava dextrin, 4.5 parts of calcium caseinate, 0.7 part of inulin, 0.9 part of soybean dietary fiber, 0.12 part of sodium chloride, 0.1 part of sodium citrate, 0.12 part of potassium citrate, 0.17 part of magnesium chloride, 0.12 part of dipotassium hydrogen phosphate, 0.08 part of compound vitamins, 0.07 part of compound minerals, 3.3 parts of compound oil, 0.4 part of phospholipid, 0.35 part of MCT, 0.015 part of gellan gum, 0.01 part of carrageenan, and 0.025 part of microcrystalline cellulose.

FIG. 1 shows the total nutrition formula emulsion prepared in the example, which is a emulsion-white or light creamy yellow homogeneous emulsion solution which is uniform and consistent in structural state and is free of macroscopic foreign matters; is mellow in taste, has an ester flavor, and is free of peculiar smell; and is fine, silky, and smooth in taste, and has better mobility.

Example 3

Low GI total nutrition formula emulsion includes the following raw material components in parts by weight: 10 parts of cassava dextrin, 2 parts of maltodextrin, 4 parts of calcium caseinate, 0.5 part of resistant dextrin, 0.8 part of soybean dietary fiber, 0.1 part of sodium chloride, 0.1 part of sodium citrate, 0.1 part of potassium citrate, 0.15 part of magnesium chloride, 0.1 part of dipotassium hydrogen phosphate, 0.05 part of compound vitamins, 0.05 part of compound minerals, 2.5 parts of compound oil, 0.3 part of phospholipid, 0.2 part of MCT, 0.015 part of gellan gum, 0.01 part of carrageenan, and 0.025 part of microcrystalline cellulose.

Figure 3:
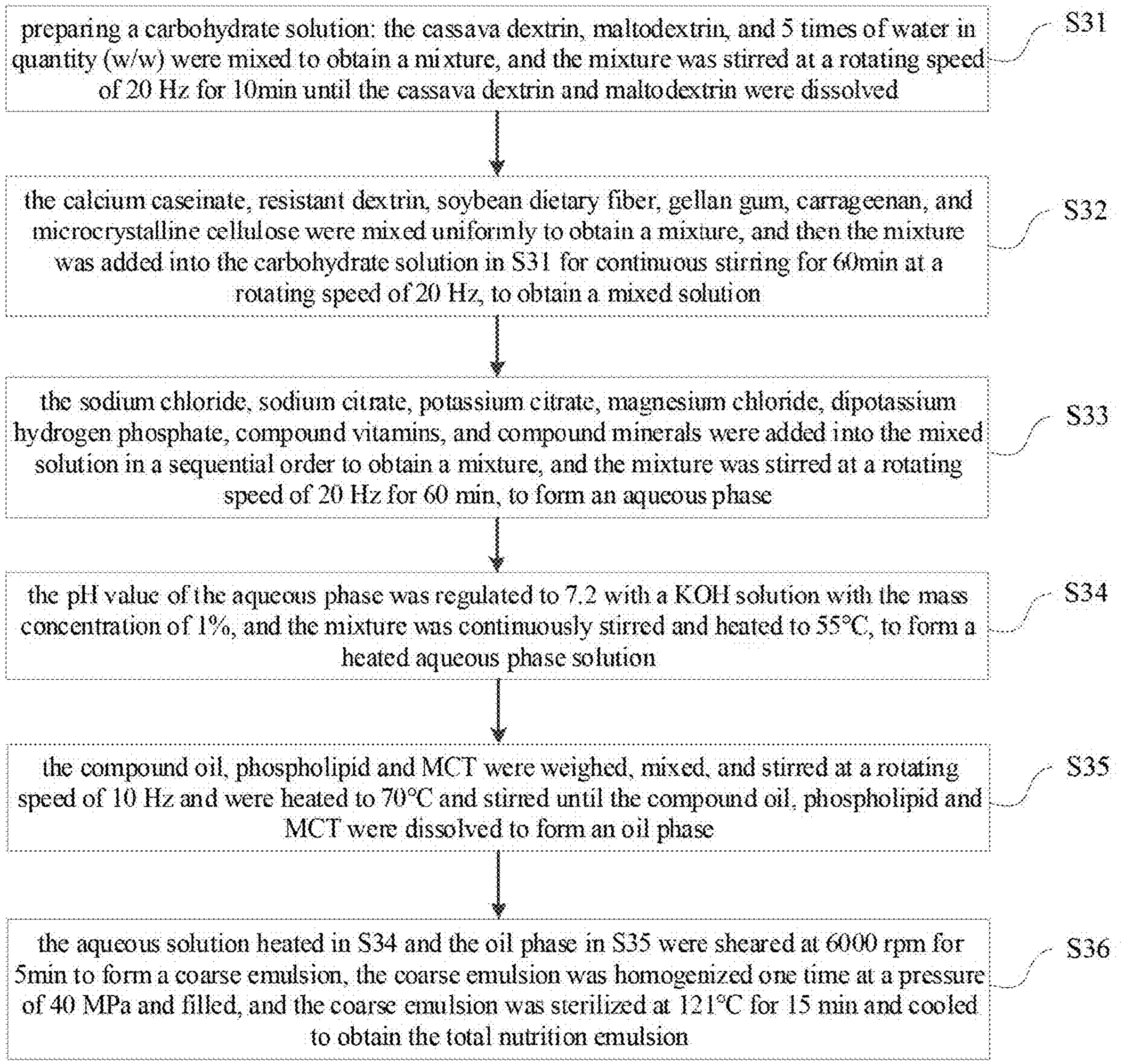
FIG. 3 is a method for preparing the low GI total nutrition formula emulsion in the example 3.

As show in FIG. 3, a method for preparing the low GI total nutrition formula emulsion in the example includes the following steps:

S31: preparing a carbohydrate solution: the cassava dextrin, maltodextrin, and 5 times of water in quantity (w/w) were mixed to obtain a mixture, and the mixture was stirred at a rotating speed of 20 Hz for 10 min until the cassava dextrin and maltodextrin were dissolved;

S32: the calcium caseinate, resistant dextrin, soybean dietary fiber, gellan gum, carrageenan, and microcrystalline cellulose were mixed uniformly to obtain a mixture, and then the mixture was added into the carbohydrate solution in S31 for continuous stirring for 60 min at a rotating speed of 20 Hz, to obtain a mixed solution;

S33: the sodium chloride, sodium citrate, potassium citrate, magnesium chloride, dipotassium hydrogen phosphate, compound vitamins, and compound minerals were added into the mixed solution in a sequential order to obtain a mixture, and the mixture was stirred at a rotating speed of 20 Hz for 60 min, to form an aqueous phase;

S34: the pH value of the aqueous phase was regulated to 7.2 with a KOH solution with the mass concentration of 1%, and the mixture was continuously stirred and heated to 55° C., to form a heated aqueous phase solution;

S35: the compound oil, phospholipid and MCT were weighed, mixed, and stirred at a rotating speed of 10 Hz and were heated to 70° C. and stirred until the compound oil, phospholipid and MCT were dissolved to form an oil phase;

S36: the aqueous solution heated in S34 and the oil phase in S35 were sheared at 6000 rpm for 5 min to form a coarse emulsion, the coarse emulsion was homogenized one time at a pressure of 40 MPa and filled, and the coarse emulsion was sterilized at 121° C. for 15 min and cooled to obtain the total nutrition emulsion.

Example 4

Low Total nutrition formula emulsion includes the following raw material components in parts by weight: 14 parts of cassava dextrin, 5 parts of calcium caseinate, 0.5 part of inulin, 0.5 part of resistant dextrin, 1 part of soybean dietary fiber, 0.15 part of sodium chloride, 0.12 part of sodium citrate, 0.15 part of potassium citrate, 0.2 part of magnesium chloride, 0.15 part of dipotassium hydrogen phosphate, 0.1 part of compound vitamins, 0.1 part of compound minerals, 3.6 parts of compound oil, 0.5 part of phospholipid, 0.5 part of MCT, 0.020 part of gellan gum, 0.015 part of carrageenan, and 0.025 part of microcrystalline cellulose.

Figure 4:
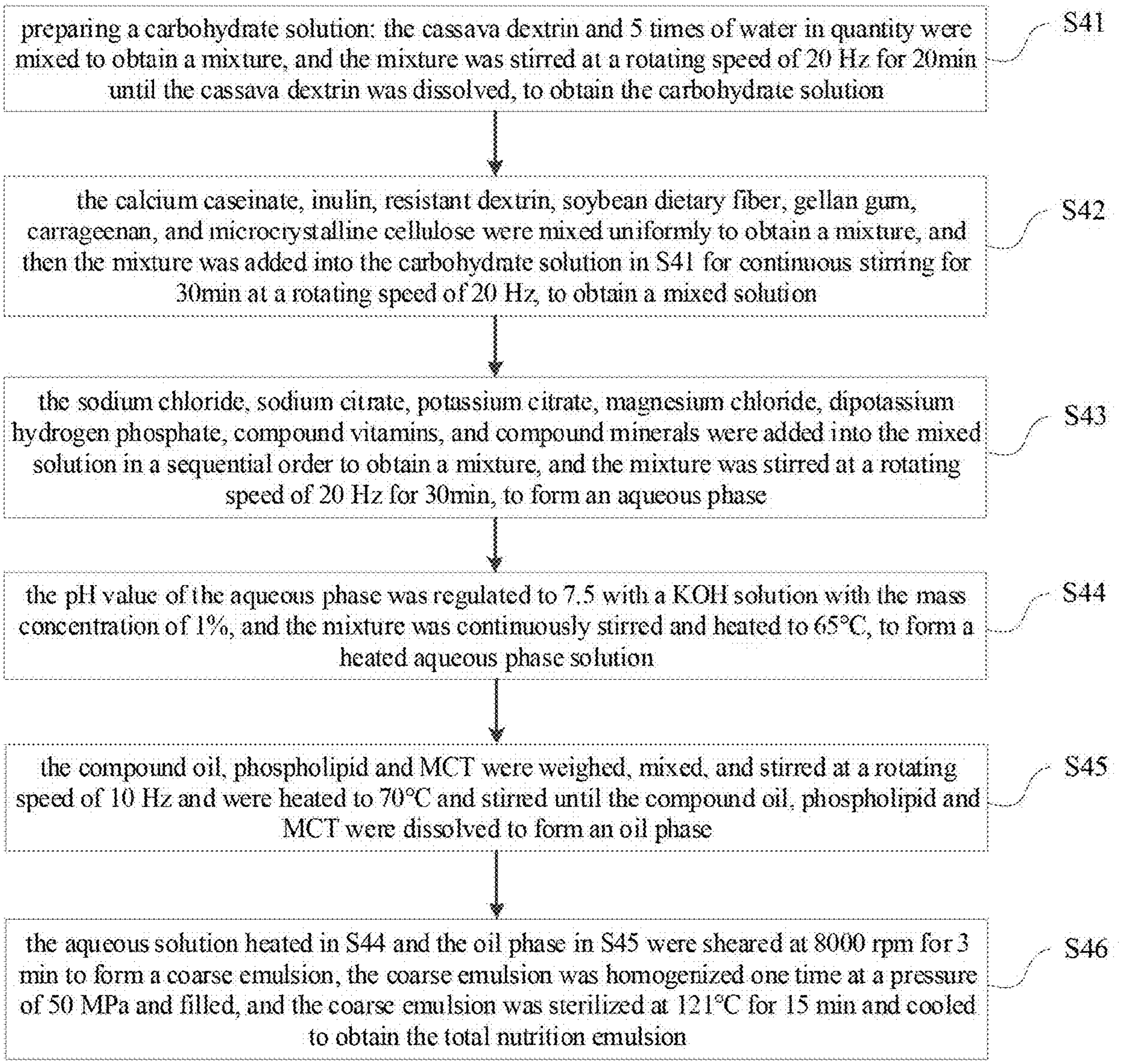
FIG. 4 is a method for preparing the low GI total nutrition formula emulsion in the example 4.

As show in FIG. 4, a method for preparing the low GI total nutrition formula emulsion in the example includes the following steps:

S41: preparing a carbohydrate solution: the cassava dextrin and 5 times of water in quantity were mixed to obtain a mixture, and the mixture was stirred at a rotating speed of 20 Hz for 20 min until the cassava dextrin was dissolved, to obtain the carbohydrate solution;

S42: the calcium caseinate, inulin, resistant dextrin, soybean dietary fiber, gellan gum, carrageenan, and microcrystalline cellulose were mixed uniformly to obtain a mixture, and then the mixture was added into the carbohydrate solution in S41 for continuous stirring for 30 min at a rotating speed of 20 Hz, to obtain a mixed solution;

S43: the sodium chloride, sodium citrate, potassium citrate, magnesium chloride, dipotassium hydrogen phosphate, compound vitamins, and compound minerals were added into the mixed solution in a sequential order to obtain a mixture, and the mixture was stirred at a rotating speed of 20 Hz for 30 min, to form an aqueous phase;

S44: the pH value of the aqueous phase was regulated to 7.5 with a KOH solution with the mass concentration of 1%, and the mixture was continuously stirred and heated to 65° C., to form a heated aqueous phase solution;

S45: the compound oil, phospholipid and MCT were weighed, mixed, and stirred at a rotating speed of 10 Hz and were heated to 70° C. and stirred until the compound oil, phospholipid and MCT were dissolved to form an oil phase;

S46: the aqueous solution heated in S44 and the oil phase in S45 were sheared at 8000 rpm for 3 min to form a coarse emulsion, the coarse emulsion was homogenized one time at a pressure of 50 MPa and filled, and the coarse emulsion was sterilized at 121° C. for 15 min and cooled to obtain the total nutrition emulsion.

Example 5

Different from the example 2, raw material components of low GI total nutrition formula emulsion are different, and the low GI total nutrition formula emulsion specifically includes the following raw material components in parts by weight: 11 parts of cassava dextrin, 4.3 parts of calcium caseinate, 0.6 part of inulin, 0.9 part of soybean dietary fiber, 0.12 part of sodium chloride, 0.1 part of sodium citrate, 0.12 part of potassium citrate, 0.16 part of magnesium chloride, 0.12 part of dipotassium hydrogen phosphate, 0.06 part of compound vitamins, 0.06 part of compound minerals, 3.0 parts of compound oil, 0.35 part of phospholipid, 0.3 part of MCT, 0.015 part of gellan gum, 0.01 part of carrageenan, and 0.025 part of microcrystalline cellulose.

Comparative Example 1

Different from the example 2, raw material components of total nutrition emulsion are different. Specifically, the cassava dextrin is replaced by maltodextrin, that is, totally 12 parts of maltodextrin.

The total nutrition formula emulsion includes the following raw material components in parts by weight: 12 parts of maltodextrin, 4.5 parts of calcium caseinate, 0.7 part of inulin, 0.9 part of soybean dietary fiber, 0.12 part of sodium chloride, 0.1 part of sodium citrate, 0.12 part of potassium citrate, 0.17 part of magnesium chloride, 0.12 part of dipotassium hydrogen phosphate, 0.08 part of compound vitamins, 0.07 part of compound minerals, 3.3 parts of compound oil, 0.4 part of phospholipid, 0.35 part of MCT, 0.015 part of gellan gum, 0.01 part of carrageenan, and 0.025 part of microcrystalline cellulose.

Comparative Example 2

Different from the example 2, raw material components of total nutrition emulsion are different. Specifically, there are 2 parts of soybean dietary fiber.

The total nutrition formula emulsion includes the following raw material components in parts by weight: 12 parts of cassava dextrin, 4.5 parts of calcium caseinate, 0.7 part of inulin, 2 part of soybean dietary fiber, 0.12 part of sodium chloride, 0.1 part of sodium citrate, 0.12 part of potassium citrate, 0.17 part of magnesium chloride, 0.12 part of dipotassium hydrogen phosphate, 0.08 part of compound vitamins, 0.07 part of compound minerals, 3.3 parts of compound oil, 0.4 part of phospholipid, 0.35 part of MCT, 0.015 part of gellan gum, 0.01 part of carrageenan, and 0.025 part of microcrystalline cellulose.

Comparative Example 3

Different from the example 2, maltodextrin and starch sugar are different in proportion. Specifically, there are 2 parts of cassava dextrin and 10 parts of maltodextrin.

The total nutrition formula emulsion includes the following raw material components in parts by weight: 2 parts of cassava dextrin, 10 parts of maltodextrin, 4.5 parts of calcium caseinate, 0.7 part of inulin, 0.9 part of soybean dietary fiber, 0.12 part of sodium chloride, 0.1 part of sodium citrate, 0.12 part of potassium citrate, 0.17 part of magnesium chloride, 0.12 part of dipotassium hydrogen phosphate, 0.08 part of compound vitamins, 0.07 part of compound minerals, 3.3 parts of compound oil, 0.4 part of phospholipid, 0.35 part of MCT, 0.015 part of gellan gum, 0.01 part of carrageenan, and 0.025 part of microcrystalline cellulose.

Comparative Example 4

Different from the example 2, raw material components of total nutrition emulsion are different. Specifically, compound minerals and compound oil are different in parts by weight.

The total nutrition formula emulsion includes the following raw material components in parts by weight: 12 parts of cassava dextrin, 4.5 parts of calcium caseinate, 0.7 part of inulin, 0.9 part of soybean dietary fiber, 0.12 part of sodium chloride, 0.1 part of sodium citrate, 0.12 part of potassium citrate, 0.17 part of magnesium chloride, 0.12 part of dipotassium hydrogen phosphate, 0.08 part of compound vitamins, 0.2 part of compound minerals, 4.7 parts of compound oil, 0.4 part of phospholipid, 0.35 part of MCT, 0.015 part of gellan gum, 0.01 part of carrageenan, and 0.025 part of microcrystalline cellulose.

Comparative Example 5

Different from the example 2, raw material components of total nutrition emulsion are different. Specifically, the calcium caseinate is replaced by soybean protein isolate.

The total nutrition formula emulsion includes the following raw material components in parts by weight: 12 parts of cassava dextrin, 4.5 parts of soybean protein isolate, 0.7 part of inulin, 0.9 part of soybean dietary fiber, 0.12 part of sodium chloride, 0.1 part of sodium citrate, 0.12 part of potassium citrate, 0.17 part of magnesium chloride, 0.12 part of dipotassium hydrogen phosphate, 0.08 part of compound vitamins, 0.07 part of compound minerals, 3.3 parts of compound oil, 0.4 part of phospholipid, 0.35 part of MCT, 0.015 part of gellan gum, 0.01 part of carrageenan, and 0.025 part of microcrystalline cellulose.

Comparative Example 6

Different from the example 2, components of low GI total nutrition formula emulsion are different. Specifically, the types of the colloids are different. The type of the colloids in the example 2 is replaced by xanthan gum, carrageenan, and sodium carboxymethylcellulose.

The total nutrition formula emulsion includes the following raw material components in parts by weight: 12 parts of cassava dextrin, 4.5 parts of calcium caseinate, 0.7 part of inulin, 0.9 part of soybean dietary fiber, 0.12 part of sodium chloride, 0.1 part of sodium citrate, 0.12 part of potassium citrate, 0.17 part of magnesium chloride, 0.12 part of dipotassium hydrogen phosphate, 0.08 part of compound vitamins, 0.07 part of compound minerals, 3.3 parts of compound oil, 0.4 part of phospholipid, 0.35 part of MCT, 0.015 part of xanthan gum, 0.01 part of carrageenan, and 0.025 part of sodium carboxymethylcellulose.

Comparative Example 7

Different from the example 2, a method for preparing low GI total nutrition formula emulsion is different. Specifically, a homogenizing pressure is different:

S1-S5 were the same as those in the example 2, namely S11-S15; and

S6: shearing, homogenizing, and sterilizing: the aqueous phase and 15% oil phase were mixed and sheared at 7000 rpm for 20 min to form a coarse emulsion, the coarse emulsion was homogenized one time at a pressure of 35 MPa, filled, sterilized at 121° C. for 15 min, and cooled to obtain the total nutrition emulsion.

Comparative Test 1: GI Testing

1. Test samples: the total nutrition formula emulsion in the examples 1-5 and the comparative examples 1-7.

2. Test method: GI of the product is tested according to an international standard ISO26442.

3. GI value testing results of the total nutrition formula emulsion in the examples and comparative examples are shown in table 1:

TABLE 1

| | GI value | | GI value |
|---|---|---|---|
| Example 1 | 55 | Comparative example 1 | 80 |
| Example 2 | 44 | Comparative example 3 | 72 |
| Example 3 | 53 | / | |
| Example 4 | 48 | | |
| Example 5 | 46 | | |

It can be seen from table 1 that compared with the comparative examples, the total nutrition formula emulsion in the examples 1-5 has a low GI value and its components are reasonably formulated.

Comparative Example 2 Sensory Performance Evaluation

1. Test samples: the total nutrition formula emulsion in the examples 1-5 and the comparative examples 1-7.

2. Test method: 30 volunteers are selected, aged from 18 to 35. Sensory evaluation on the product is performed according to PRC National Standard GB10220.

3. A sensory evaluation standard for the total nutrition emulsion is shown in table 2.

TABLE 2

| Item | Scoring standard | Sensitive score | Weighted value (%) |
|---|---|---|---|
| Structural state | Homogeneous emulsion which is not layered and is not hung on the wall | 80-100 | 50 |
| | Homogeneous emulsion which is not layered and is less hung on the wall | 60-80 | |
| | Inhomogeneous emulsion which is layered and is not hung on the wall | 40-60 | |
| | Inhomogeneous emulsion which is severely sealed and is hung on the wall | 0-40 | |
| Taste and odor | With milk flavor and without peculiar smell | 80-100 | 30 |
| | With milk flavor and acceptable peculiar smell | 60-80 | |
| | Without milk flavor and with acceptable peculiar smell | 40-60 | |
| | Without milk flavor and with peculiar smell | 0-40 | |
| Color and luster | Uniform color and luster, milk-white or light creamy yellow | 80-100 | 20 |
| | Uniform color and luster, creamy yellow or brown | 60-80 | |
| | Non-uniform color and luster, milk-white or light creamy yellow | 40-60 | |
| | Non-uniform color and luster, creamy yellow or brown | 0-40 | |

Sensory evaluation results for the total nutrition emulsion are shown in table 3.

TABLE 3

| | Sensory score | | | |
|---|---|---|---|---|
| Test sample | Structural state | Taste and odor | Color and luster | Weighted score |
| Example 1 | 95.3 | 90.6 | 95.5 | 93.9 |
| Example 2 | 96.2 | 92.5 | 96.6 | 95.2 |
| Example 3 | 95.2 | 93.2 | 96.5 | 94.9 |
| Example 4 | 92.5 | 90.6 | 93.5 | 92.1 |
| Example 5 | 94.3 | 93.5 | 95.4 | 94.3 |
| Comparative example 1 | 93.4 | 92.2 | 95.6 | 93.5 |
| Comparative example 2 | 88.5 | 89.6 | 95.3 | 90.2 |
| Comparative example 3 | 94.2 | 93.3 | 93.5 | 93.8 |
| Comparative example 4 | 86.8 | 85.3 | 94.5 | 87.9 |
| Comparative example 5 | 70.3 | 73.5 | 78.2 | 72.8 |

TABLE 3-continued

| | Sensory score | | | |
|---|---|---|---|---|
| Test sample | Structural state | Taste and odor | Color and luster | Weighted score |
| Comparative example 6 | 75.3 | 81.5 | 81.2 | 78.3 |
| Comparative example 7 | 94.2 | 92.5 | 95.4 | 93.9 |

It can be seen from table 3 that compared with the comparative examples, the total nutrition formula emulsion in the examples 1-5 has a higher sensory score, so that the flavor quality of the product is more excellent.

Comparative Experiment 3 System Stability

1. Test samples: the total nutrition formula emulsion in the examples 1-5 and the comparative examples 1-7.

2. Test method: a stability index of the total nutrition formula emulsion is measured with a particle dispersion stability analyzer. The particle dispersion stability analyzer is based on the Stocks theory and the Lambert-Beer's law to measure the stability of the emulsion by centrifugal accelerated layering (precipitating or upward floating). The stability index of the emulsion can be calculated according to a light transmittance variation spectrum. The stability index reflects an overall layering condition of the sample in the high-speed centrifugal process. The greater the stability index is, the more severe the emulsion is layered, and the stability of the emulsion system is poorer. On the contrary, the less the stability index is, the slighter the emulsion is layered, and the stability of the emulsion system is better. The test results are shown in table 4.

TABLE 4

| Test sample | Stability index | Experimental sample | Stability index |
|---|---|---|---|
| Example 1 | 0.025 | Comparative example 2 | 0.053 |
| Example 2 | 0.021 | Comparative example 4 | 0.081 |
| Example 3 | 0.026 | Comparative example 5 | 0.122 |
| Example 4 | 0.035 | Comparative example 6 | 0.126 |
| Example 5 | 0.020 | Comparative example 7 | 0.041 |

It can be seen from table 4 that compared with the comparative examples, the total nutrition formula emulsion in the examples 1-5 has a less stability index, indicating that the present invention has better system stability.

Finally, it shall be noted that the above is merely used for describing the technical solution of the present invention rather than limiting the scope of protection of the present invention. A person of ordinary skill in the art simply modifies or equivalently replaces the technical solution by without departing the substance and scope of the technical solution of the present invention.

What is claimed is:

1. Low GI total nutrition formula emulsion, comprising the following raw material components in parts by weight: 10-14 parts of carbohydrates, wherein the carbohydrates are cassava dextrin or a mixture of cassava dextrin and maltodextrin, and when the carbohydrates are the mixture of cassava dextrin and maltodextrin, a mass ratio of the cassava dextrin to the maltodextrin is (10-8): (2-4), 4-5 parts of calcium caseinate, 1.3-2 parts of dietary fiber, 0.1-0.15 part of sodium chloride, 0.1-0.12 part of sodium citrate, 0.1-0.15 part of potassium citrate, 0.15-0.2 part of magnesium chloride, 0.1-0.15 part of dipotassium hydrogen phosphate, 0.05-0.1 part of compound vitamins, 0.05-0.1 part of compound minerals, 2.5-3.6 parts of compound oil, 0.3-0.5 part of phospholipid, 0.2-0.5 part of medium chain triglyceride (MCT), and 0.04-0.08 part of colloids.

2. The low GI total nutrition formula emulsion according to claim 1, comprising the following raw material components in parts by weight: 11-13 parts of carbohydrates, 4.3-4.8 parts of calcium caseinate, 1.5-1.8 parts of dietary fiber, 0.12-0.13 part of sodium chloride, 0.1-0.11 part of sodium citrate, 0.12-0.13 part of potassium citrate, 0.16-0.18 part of magnesium chloride, 0.12-0.13 part of dipotassium hydrogen phosphate, 0.06-0.08 part of compound vitamins, 0.06-0.08 part of compound minerals, 3.0-3.6 parts of compound oil, 0.35-0.45 part of phospholipid, 0.3-0.4 part of MCT, and 0.05-0.07 part of colloids.

3. The low GI total nutrition formula emulsion according to claim 2, comprising the following raw material components in parts by weight: 12 parts of carbohydrates, 4.5 parts of calcium caseinate, 1.6 parts of dietary fiber, 0.12 part of sodium chloride, 0.1 part of sodium citrate, 0.12 part of potassium citrate, 0.17 part of magnesium chloride, 0.12 part of dipotassium hydrogen phosphate, 0.08 part of compound vitamins, 0.07 part of compound minerals, 3.3 parts of compound oil, 0.4 part of phospholipid, 0.35 part of MCT, and 0.05 part of colloids.

4. The low GI total nutrition formula emulsion according to claim 1, wherein the dietary fiber is selected from at least two of inulin, resistant dextrin, and soybean dietary fiber; and the colloids are selected from at least one of gellan gum, carrageenan, and microcrystalline cellulose.

5. The low GI total nutrition formula emulsion according to claim 1, wherein a mass ratio of the dietary fiber, the compound minerals and the compound oil is (1.3-2):(0.05-0.1):(3.0-3.6).

* * * * *